Patented July 10, 1945

2,380,006

UNITED STATES PATENT OFFICE 2,380,006

METHOD OF PREPARING SULPHANILYL GUANIDINE

Philip S. Winnek, Riverside, and Herman E. Faith, Stamford, Conn., assignors to American Cyanamid Company, New York, N. Y., a corporation of Maine No Drawing. Application February 10, 1942, Serial No. 430,246

6 Claims. (Cl. 260—397.7)

This invention relates to a new and improved process for producing sulphanilyl guanidine.

Sulphanilyl guanidine is an important chemotherapeutic agent, and it is an object of this invention to provide a new and improved process for the production of sulphanilyl guanidine in a substantially pure form suitable for therapeutic use. It is a further object of this invention to provide a process for producing sulphanilyl guanidine which permits the use of readily available and relatively cheap starting materials.

In accordance with the present invention we have found that sulphanilyl guanidine may be prepared by reacting an acylsulphanilyl cyanamide or salt thereof with compounds yielding ammonia. In general, the reaction is carried out by heating or fusing an acylsulphanilyl cyanamide or salt thereof with a compound which will yield ammonia at temperatures below the decomposition point of the acylsulphanilyl cyanamides. In this heating or fusion step an acylsulphanilyl guanidine is obtained which can then be hydrolyzed to sulphanilyl guanidine.

The present invention is not limited to the use of any particular acylsulphanilyl cyanamide or salt. In fact, any of the ordinary carboxylic acyl compounds, such as the acetyl, propionyl, benzoyl, nicotinyl, and the like, may be used. Since, however, the acetyl group is easy to hydrolyze and is probably the cheapest and most readily available acyl compound, we prefer to use the acetylsulphanilyl cyanamide compound. Similarly, the salts which we employ as starting materials may be those of any metal sufficiently strong to form salts with the acylsulphanilyl cyanamides since the metal does not materially affect the reaction. Preferably we use the calcium or sodium salts since they are the cheapest. However, the same results are obtainable with the corresponding potassium or ammonium salts. We have found that our process is particularly well adapted to the use of the calcium salt of acetylsulphanilyl cyanamide, and it is therefore the starting material which we prefer.

The present invention is not concerned with any particular method of preparing the starting materials employed, and it is obvious that the acylsulphanilyl cyanamides may be prepared by reacting the corresponding acylsulphanilyl chloride with cyanamide or calcium cyanamide in accordance with known processes.

The compounds which we prefer to react with the acylsulphanilyl cyanamide salt in our process are those which will yield ammonia on fusing at a relatively low temperature, i. e., at temperatures below the decomposition point of the acylsulphanilyl cyanamide or the acylsulphanilyl guanidine. It is obvious, therefore, that the temperatures employed may be varied somewhat depending upon the particular ammonia yielding compound employed, and the invention is not to be limited by the temperature range specified in the specific examples. Suitable ammonia yielding compounds for use in carrying out our invention include those such as ammonium nitrate, thiourea, ammonium carbonate, ammonium carbamate, ammonium acetate, ammonium cyanate, ammonium thiocyanate, urea, and the like. Under suitable conditions, such as for example, in a closed vessel under pressure, the use of ammonia gas, liquid ammonia, or aqueous ammonium hydroxide is not precluded from the scope of our invention.

The invention will be described in greater detail in conjunction with the following specific examples, which, however, are merely illustrative of the preferred method of preparing representative compounds of the class and are not intended to limit the scope of the invention. The parts are by weight except in the case of liquids which are expressed in corresponding parts by volume.

EXAMPLE 1

*Preparation of sulphanilyl guanidine*

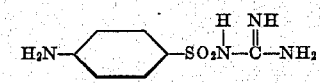

Ten parts of calcium acetylsulphanilyl cyanamide,

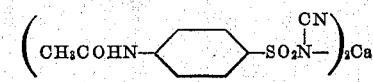

were heated at 200° C. for fifteen minutes with 7 parts of ammonium nitrate. The melt was cooled to 95° C. and mixed with water. This mixture was then heated to dissolve the compound and filtered. The cooled filtrate yielded $N^4$-acetylsulphanilyl guanidine.

5.9 parts of $N^4$-acetylsulphanilyl guanidine were added gradually to 24 parts of 3N hydrochloric acid with vigorous stirring and heating. By the time the temperature has reached the boiling point all the solid has dissolved. Boiling was continued for ten minutes, and the hot solution was poured upon a mixture of ice and water. The solution was stirred one hour with decolorizing carbon, filtered and neutralized with sodium hydroxide solution with cooling. The precipitated sulphanilyl guanidine was then recrystallized from hot water.

EXAMPLE 2

*Preparation of sulphanilyl guanidine*

Ten parts of calcium acetylsulphanilyl cyanamide

were mixed with 8 parts of thiourea. This was fused at 200° to 220° C. for ten minutes. The melt was then cooled at 95° C., diluted with water and heated to dissolve all of the product. Upon filtering and cooling the solution, crystalline acetylsulphanilyl guanidine was obtained. This was hydrolyzed as described in Example 1 to yield sulphanilyl guanidine.

As indicated previously in the specification, various other salts of acetylsulphanilyl cyanamide may be employed instead of the calcium salt. Similarly, the starting material may be acetylsulphanilyl cyanamide or any other acylsulphanilyl cyanamide of an organic carboxylic acid. The ammonium nitrate and thiourea employed in the foregoing examples could obviously be replaced by any one of the compounds mentioned heretofore which will yield ammonia on fusing with the acylsulphanilyl cyanamide or salts.

The $N^4$-acylsulphanilyl guanidine obtained in the fusion reaction may be hydrolyzed by any suitable known hydrolysis treatment.

The above description and examples are intended to be illustrative only. Any modification or variation therefrom which conforms to the spirit of the invention is intended to be included within the scope of the claims.

What we claim is:

1. The process which comprises fusing a metal salt of an acylsulphanilyl cyanamide with a compound which liberates ammonia at a temperature below the decomposition point of the reaction product to give an acylsulphanilyl guanidine.

2. The process which comprises fusing a metal salt of an acylsulphanilyl cyanamide with a compound which liberates ammonia at a temperature below the decomposition point of the reaction product to give an acylsulphanilyl guanidine, and hydrolyzing to give sulfanilyl guanidine.

3. The process which comprises fusing calcium acetylsulphanilyl cyanamide with a compound which liberates ammonia at a temperature below the decomposition point of the reaction product to give acetylsulphanilyl guanidine.

4. The process which comprises fusing calcium acetylsulphanilyl cyanamide with a compound which liberates ammonia at a temperature below the decomposition point of the reaction product to give acetylsulphanilyl guanidine, and hydrolyzing to sulphanilyl guanidine.

5. The process which comprises fusing calcium acetylsulphanilyl cyanamide with ammonium nitrate at a temperature of about 200° C. to give acetylsulphanilyl guanidine.

6. The process which comprises fusing calcium acetylsulphanilyl cyanamide with thiourea at a temperature of about 200° C. to 220° C. to give acetylsulphanilyl guanidine.

PHILIP S. WINNEK.
HERMAN E. FAITH.